United States Patent Office 2,773,909
Patented Dec. 11, 1956

2,773,909

ADDITION OF HYDROGEN PEROXIDE TO OLEFINIC COMPOUNDS

Curtis W. Smith, Berkeley, Calif., assignor to Shell Development Company, Emeryville, Calif., a corporation of Delaware No Drawing. Application June 23, 1952,
Serial No. 295,112

4 Claims. (Cl. 260—635)

This invention relates to the hydroxylation of olefinic compounds by reaction with hydrogen peroxide in the presence of heteropolytungstic acids which catalyze the addition of the hydrogen peroxide to the olefinic double bond. It deals with a new method of carrying out the reaction in a more expeditious manner which is especially useful for the commercial scale production of polyhydroxy organic compounds.

As pointed out in Bergsteinsson patent, U. S. 2,373,942, certain heteropolytungstic acids, particularly silicotungstic acid, borotungstic acid and the various phosphotungstic acids, can be used as catalysts for the addition of hydrogen peroxide to olefinic compounds to form polyhydroxy compounds such as glycols and the like. These catalysts have been used in the reaction in the same way as tungstic acid which is also a very effective catalyst for hydroxylation but is known to promote further oxidation to aldehydes, ketones, carboxylic acids and other oxidation products unless the operating conditions are properly controlled. For this reason, it has been recommended that hydroxylations with heteropolytungstic acids as catalysts be carried out at temperatures below 60° C. and preferably at about room temperature, or slightly higher temperatures in the range of 30° C.–50° C. which have the advantage of shortening the reaction time. Even at these temperatures, quite long reaction periods are required in order to achieve high conversions; 45 hours being recommended by Bergsteinsson when using phosphotungstic acid as the catalyst at 40° C.

An important object of the present invention is to provide a process for hydroxylating unsaturated organic compounds by reaction with hydrogen peroxide under the catalytic influence of heteropolytungstic acids which can be carried out more rapidly and, hence, in smaller equipment requiring less capital investment than the previous methods. Another object is to obtain high yields of desirable polyhydroxy products at high throughput rates in this type of reaction. A special object is the provision of a particularly advantageous method for the production of glycerine. Still other objects of the invention will be apparent from the following description of the new process.

It has been found that, contrary to the teachings of the prior art, heteropolytungstic acids can be successfully used at relatively high temperatures, namely, about 70° C. to 100° C., to produce high yields of polyhydroxy compounds from the reaction of the corresponding olefinic compounds with hydrogen peroxide. By this method of operation, materially shorter reaction times are made feasible without undue loss through formation of less desirable oxidation products and, in fact, higher yields of valuable hydroxylation products than those previously reported are made possible. This is quite unexpected since it would have been predicted on the basis of previous teachings respecting the activity of heteropolytungstic acid catalysts that any increase in the reaction temperature sufficient to reduce the reaction time substantially would involve excessive losses through oxidation. As a result of this finding, commercial production of relatively cheap, tonnage scale chemicals by hydroxylation of olefinic compounds under the catalytic influence of heteropolytungstic acids is made practical due to the lowered investment required and the high yields obtained. Thus, glycerine, for example, can be made competitively with the natural product.

The process is advantageous in the hydroxylation of a wide variety of different olefinic compounds, that is organic compounds having in the molecule at least one double bond directly linking two carbon atoms of aliphatic character. Olefinic hydrocarbons which can be thus successfully hydroxylated include, for example, mono-olefins such as ethylene, propylene, 1-butene, 2-butene, isobutylene, the amylenes, 1-octene, 1-decene, dodecenes from propylene polymerization, 1-hexadecene, cyclopentene, cyclohexene, 4-methylcyclohexene, octahydronaphthalene, and styrene; polyolefins such as allene, butadiene, isoprene, cyclopentadiene, cyclohexadiene, hexahydronaphthalene, 1,4-divinylbenzene, etc. Unsaturated alcohols are another class of olefinic compounds which can be effectively hydroxylated with the described new hydroxylation catalysts. Such alcohols are, for instance, allyl alcohol, methallyl alcohol, crotyl alcohol, allyl carbinol, methyl vinyl carbinol, dimethyl allyl carbinol, oleyl alcohol, citronellol, geraniol, linalool, cyclohexenol, the terpineols, cinnamyl alcohol, and related mono- and poly-olefinic mono- and poly-hydroxy alcohols. Ethers of the foregoing alcohols which may be the simple ethers or mixed ethers with either saturated or unsaturated alcohols can likewise be hydroxylated with advantage under the catalytic influence of the described heteropoly acids. Typical of these ethers are diallyl ether, ethyl allyl ether, isopropyl isopropenyl ether, isocrotyl butyl ether, allyl cyclohexyl ether, methyl cyclohexenyl ether, ethyl oleyl ether, methallyl cinnamyl ether, etc.

Unsaturated carboxylic acids such as acrylic acid, methacrylic acid, crotonic acid, vinyl acetic acid, tiglic acid, oleic acid, linoleic acid, ricinolei acid, sorbic acid, maleic acid, tetrahydrobenzoic acid, cyclohexylidene acetic acid, cinnamic acid, etc. can likewise be hydroxylated with advantage by the new process. Esters of these acids with saturated or unsaturated alcohols or esters of the previously mentioned olefinic alcohols with carboxylic acids constitute another class of unsaturated compounds with which the present process is especially useful in promoting rapid hydroxylation with minimum loss of reactants. Examples of suitable esters are, for instance, methyl acrylate, ethyl methacrylate, propyl crotonate, allyl crotonate, allyl acetate, oleyl acetate, cyclohexyl acrylate, diethyl maleate, acrolein diacetate, oleyl cinnamate, ethyl linoleate, and the like.

Olefinic ketones or aldehydes can also be hydroxylated under the catalytic influence of heteropolytungstic acids at temperatures of 70° C. to 100° C., in accordance with the invention, although oxidation to acids may accompany the hydroxylation in the case of the olefinic aldehydes. Carbonyl compounds of this type which can be used in the process are, for example, methyl vinyl ketone, methyl allyl ketone, ethyl isopropenyl ketone, mesityl oxide, phorone, isophorone, methyl cyclohexenyl ketone, vinyl phenyl ketone, benzoyl acetone, acrolein, crotonaldehyde, citronellal, the cyclocitrals, ionone, cinnamyl aldehyde, etc. Unsaturated haldies such as allyl chloride, crotyl bromide, methallyl chloride and the like are another type of olefinic compounds which can be successfully hydroxylated by the described method and which are also effective in hydroxylating unsaturated amines such as diallyl amine, unsaturated amides, and the like.

The heteropolytungstic acids which are used as catalysts in the process of the invention are polyacids which contain at least one acidic radical derived from tungsten, together with one or more acidic radicals derived from at least one other negative element. The proportion of tungsten to other acid-forming element or elements in the complex anion of the heteropolytungstic acid catalysts can vary from 1:1 to 12:1 on an atomic basis. Any of the acid-forming elements of groups II to VII of the periodic table may be used to form these heteropolytungstic acids. These catalysts can be readily prepared in active form in a number of different ways. One suitable method is to dissolve a mixture of a tungstic acid salt and a salt of an acid of the other element which is to form the heteropoly acid with the tungsten or a plurality of salts of such other elements in water. Typical of the salts which are suitable are the alkali metal borates, aluminates, carbonates, silicates, stannates, plumbates, selenates, nitrates, phosphates, vanadates, arsenates, bismuthates, sulfates, chromates, molybdates and manganates. The salts thus dissolved should be in proportions corresponding to the desired ratio of tungsten to the other acid-forming element or elements which is desired in the catalyst. The solution is then acidified, for example, with hydrochloric acid in an amount sufficient to liberate the acids from the salts. The heteropolytungstic acid thus produced can be extracted from the solution with a suitable solvent, for instance, ether, and then recovered from the extract by evaporating off the solvent.

The phosphotungstic acids are one example of a suitable subclass of heteropolytungstic acids which have been found useful in the new process. Among these are, for instance, the biheterophosphotungstic acids such as 12-tungstophosphoric acid, 9-tungstophosphoric acid, 6-tungstophosphoric acid, 3-tungstophosphoric acid, and 12-phosphotungstic acid, as well as more complex phosphotungstic acids such as 9-tungsto-3-molybdophosphoric acid and 6-tungsto-6-molybdophosphoric acid. The borotungstic acids are another important subclass of suitable catalysts, according to the invention, examples of which are 12-tungstoboric acid, 9-tungstoboric acid, 6-tungstoboric acid, 12-borotungstic acid, 9-tungsto-3-molybdoboric acid and 9-tungsto-3-manganoboric acid. Especially advantageous are the heteropolytungstic acids of arsenic, antimony and bismuth and of the acid-forming elements of group VI. These are novel hydroxylation catalysts whose use for such purpose is claimed in my copending application Serial No. 290,329 and Serial No. 290,330, filed May 27, 1952. Other heteropolytungstic acids which are useful catalysts in the present invention are, for example, 12-tungstocarbonic acid, 12-tungstomanganic acid, 12-tungstonitric acid, 12-tungstosilicic acid, 12-tungstostannic acid, 12-tungstovanadic acid and periodotungstic acid ($I_2O_7 \cdot 12WO_3 \cdot 11H_2O$), aluminotungstic acid ($Al_2O_3 \cdot 24WO_3 \cdot 65H_2O$), and 9-tungstosilicovanadic acid ($V_2O_5 \cdot SiO_2 \cdot 9WO_3 \cdot 27H_2O$). The 12-tungsto heteropoly acids are generally the preferred form of the biheteropolytungstic acids, and, as a general rule, it is preferable to use heteropolytungstic acids which contain at least as many tungsten atoms as there are other acid-forming hetero atoms in the complex anion.

The heteropolytungstic acid can be used as the catalyst in the process in the form of a solution or suspension in the reaction mixture or deposited on a suitable carrier such as alumina, silica gel, active carbon, kieselguhr or other diatomaceous earth, or the like. As a general rule, between about 0.1% and about 25% of the chosen heteropolytungstic acid or mixture of such heteropolytungstic acids, based upon the weight of the olefinic compound to be hydroxylated, is employed in the new process. Most preferably, about 1% to about 10% by weight of heteropolytungstic acid is used when hydroxylating a water-soluble olefinic compound in aqueous solution.

It is preferred to use a stoichiometric excess of olefinic compound to hydrogen peroxide in the reaction since more complete conversion of hydrogen peroxide to desirable hydroxylation products can be achieved in this way. A mole ratio of olefinic compound to hydrogen peroxide of 1.1:1 to about 4:1 is advantageous. The new process is preferably carried out in the presence of a diluent, most desirably a solvent for the olefinic compound being hydroxylated. Water is an especially useful diluent to use with water-soluble olefinic compounds and is preferably employed in amounts between about 75 and about 200 moles per mole of peroxide added. Such amount of water not only accelerates the hydroxylation reaction but also improves the yields of hydroxylation products. As previously pointed out, a temperature within the range of about 70° C. to about 100° C. is used for hydroxylation in the presence of heteropolytungstic acid catalysts according to the invention; most preferably, a temperature between about 70° C. and 90° C. is employed in order to get shortened reaction times, together with high yields of desirable products. Continuous methods of operation of the process are generally preferable, but batch and intermittent methods of reaction, according to the invention, have been successfully used also.

As previously pointed out, many different types of olefinic compounds can be hydroxylated successfully by reaction with hydrogen peroxide at 70° C. to 100° C. under the catalytic influence of a heteropolytungstic acid in accordance with the invention. Hydroxylations which have been thus successfully carried out with olefinic hydrocarbons include, for example, the production of propylene glycol from propylene, the production of 3-methyl-1,2-dihydroxybutane from isopropylethylene, phenyl dihydroxyethane from styrene, erythritol, and by the use of lower proportions of hydrogen peroxide, 1,2-dihydroxybutene-2 from butadiene. Among reactions of unsaturated alcohols which can be efficiently carried out, especially with hydrogen peroxide as the hydroxylating agent, by the described new process using heteropolytungstic acid catalysts are, for instance, the conversion of methallyl and crotyl alcohols to methyl glycerines, oleyl alcohol to 1,9,10-trihydroxyoctadecane, geraniol to 3,7-dimethyl-1,2,3,6,7-pentahydroxyoctane, and cinnamyl alcohol to phenyl glycerine, and related mono- and polyolefinic mono- and poly-hydroxy alcohols. Simple or mixed ethers of olefinic alcohols with either saturated or unsaturated alcohols can likewise be hydroxylated with advantage under the same conditions; thus, diallyl ether is converted to allyl glycerol ether and/or diglycerol ether, depending upon the proportion of hydrogen peroxide used; allyl cyclohexyl ether is converted to cyclohexyl glycerol ether, and methyl cyclohexenyl ether is converted to the monomethyl ether of trihydroxycyclohexane. Examples of the application of the invention to unsaturated carboxylic acids are the production of glyceric acid from acrylic acid, alpha,beta-dihydroxybutyric acid from crotonic acid, arabonic acid from vinyl acrylic acid, and tartaric acid from maleic acid. The present process is especially useful in promoting rapid hydroxylation of esters, for instance, of ethyl methacrylate to ethyl alpha-methyl glycerate, allyl acetate to glycerol monoacetate, diethyl glutaconate to diethyl alpha,beta-dihydroxyglutarate, and acrolein diacetate to glyceryl-aldehyde diacetate. Similarly, monochlorhydrin is produced from allyl chloride and beta-methyl glycerol monobromhydrin from methallyl bromide.

The following examples illustrate typical methods of carrying out these reactions by the new process and show some of the advantages which it makes possible.

*Example I*

Allyl alcohol was hydroxylated to produce glycerol by reaction with hydrogen peroxide in a stirred reactor provided with a reflux condenser using phosphotungstic acid ($P_2O_5 \cdot 24WO_3 \cdot 42H_2O$) as the catalyst. The reactor was charged with 2106 parts by weight of water, 174 parts of allyl alcohol and 15 parts of the 12-phosphotungstic acid catalyst. The mixture was heated to 70° C. with stirring and 150 parts by weight of a 34% aqueous hydrogen peroxide solution was added. The temperature was kept at 70° C. throughout the reaction. Samples were withdrawn periodically for titration and it was found that the hydrogen peroxide was 87% consumed in 15 minutes, 96.3% in 30 minutes and 97.6% in 45 minutes. The conversion of the hydrogen peroxide applied to glycerol was 84% of theory in one hour and 85.7% in two hours, after which the glycerol produced was recovered by first distilling off the excess alcohol and then the glycerol from the reaction mixture. The yield of glycerol based on allyl alcohol reacted was 90% of theory.

Under the same conditions with berylotungstic acid ($BeO \cdot 12WO_3 \cdot 24H_2O$) a yield about 2% higher is obtained in the same reaction period. Equally good results are also obtained with 12-tungstomanganic acid as the catalyst.

These results are a marked improvement over those obtained by the prior method of operation in which, as shown by Example V of the Bergsteinsson patent previously referred to (U. S. 2,373,942), 45 hours' reaction at 40° C. is required to obtain a 97% conversion of hydrogen peroxide and a yield of allyl alcohol of only 78% based on the hydrogen peroxide used, or 80.5% based on the hydrogen peroxide consumed in the reaction when employing the same phosphotungstic acid as catalyst.

*Example II*

Cyclohexene was hydroxylated by reaction with hydrogen peroxide using acetic acid as the solvent. The reaction was carried out with a mole ratio of cyclohexene to hydrogen peroxide of 2:1 using 102 parts by weight of a 33.4% hydrogen peroxide solution to a solution of 164 parts by weight of cyclohexene in 724 parts of acetic acid containing 5 parts of selenotungstic acid. After 2 hours at 70° C., 98% of the hydrogen peroxide had reacted and the excess cyclohexene, 81 parts by weight, was removed by steam distillation. The residue was acetylated with acetic anhydride and then distilled to obtain, besides acetic acid and acetic anhydride, 160 parts by weight of 1,2-cyclohexanediol diacetate, boiling at 123° C.–125° C. at 15 mm. of mercury pressure. This corresponds to a yield of 80% based upon the hydrogen peroxide reacted.

Good results are also obtained by the use of 12-tungstotelluric acid or 12-tungstomolybdic acid in place of the selenotungstic acid under the same conditions.

I claim as my innvention:

1. A process of producing glycerine which comprises reacting allyl alcohol with aqueous hydrogen peroxide at a temperature of about 70° C. to 90° C. under the catalytic influence of a member of the group consisting of the tungstoheteropoly acids of phosphorus, beryllium and manganese.

2. A process of producing glycerine which comprises reacting a stoichiometric excess of allyl alcohol in aqueous solution with hydrogen peroxide in the presence of about 0.1% to about 25% by weight of the allyl alcohol of a heteropolytungstic acid of manganese within the temperature range of about 70° C. to about 85° C. until substantially complete conversion of the free hydrogen peroxide is effected.

3. A process of producing glycerine which comprises reacting allyl alcohol with hydrogen peroxide under the catalytic influence of about 0.1% to about 25% by weight of said alcohol of a phosphotungstic acid at a temperature of about 70° C.

4. A process for producing glycerine, which comprises reacting allyl alcohol with hydrogen peroxide in the presence of about 0.1% to about 25% by weight of said allyl alcohol of berylotungstic acid at a temperature between about 70° C. and 90° C.

References Cited in the file of this patent

UNITED STATES PATENTS

| 2,373,942 | Bergsteinsson | Apr. 17, 1945 |
| 2,613,223 | Young | Oct. 7, 1952 |

OTHER REFERENCES

Mugdan et al.: Jour. Chem. Soc. (London), 1949, pp. 2988–3000.